(12) United States Patent
Seward (10) Patent No.: US 7,341,369 B2
(45) Date of Patent: Mar. 11, 2008

(54) ISOTROPIC ILLUMINATION

(75) Inventor: George H. Seward, Arlington, MA (US)

(73) Assignee: Cytyc Corporation, Marlborough, MA (US)

( * ) Notice: Subject to any disclaimer, the term of this patent is extended or adjusted under 35 U.S.C. 154(b) by 195 days.

(21) Appl. No.: 10/956,651

(22) Filed: Oct. 1, 2004

(65) Prior Publication Data
US 2006/0072335 A1    Apr. 6, 2006

(51) Int. Cl.
*F21V 8/00* (2006.01)
(52) U.S. Cl. ............................ 362/551; 362/26
(58) Field of Classification Search ............... 362/551, 362/26, 268, 296, 297, 298, 458, 558; 356/451, 356/452, 456; 382/133
See application file for complete search history.

(56) References Cited

U.S. PATENT DOCUMENTS

| | | | |
|---|---|---|---|
| 3,981,590 A * | 9/1976 | Perkins ....................... 356/407 |
| 4,918,583 A * | 4/1990 | Kudo et al. .................. 366/268 |
| 5,677,762 A * | 10/1997 | Ortyn et al. ................... 356/39 |
| 5,692,066 A * | 11/1997 | Lee et al. .................... 382/133 |
| 5,797,674 A * | 8/1998 | Nagayama .................. 362/268 |
| 5,971,577 A | 10/1999 | Mori et al. |
| 6,847,480 B2 * | 1/2005 | Steenblik et al. ........... 359/368 |
| 7,016,566 B2 * | 3/2006 | Dimas et al. ................. 385/35 |
| 2002/0109912 A1 | 8/2002 | Knoblich |

FOREIGN PATENT DOCUMENTS

| | | |
|---|---|---|
| DE | 31 47 998 A1 | 6/1983 |
| DE | 36 24 687 A1 | 5/1987 |
| JP | 09 184985 A | 7/1997 |
| JP | 2001 290079 A | 10/2001 |
| JP | 2002 006226 A | 1/2002 |
| JP | 2004 037725 A | 2/2004 |
| WO | WO 2005/031431 A | 4/2005 |

OTHER PUBLICATIONS

PCT International Search Report for PCT/US2005/034017, Applicant: Cytyc Corporation, Forms PCT/ISA/210 and 220, dated Feb. 17, 2005 (7 pages).
PCT Written Opinion of the International Search Authority for PCT/US2005/034017, Applicant: Cytyc Corporation, Form PCT/ISA/237, dated Feb. 17, 2005 (4 pages).

* cited by examiner

*Primary Examiner*—Sharon E. Payne
(74) *Attorney, Agent, or Firm*—Vista IP Law Group LLP (57) ABSTRACT

An isotropic illuminator is described, including a relay lens configured to focus a source image propagated from a source and a lightpipe having an entrance aperture and an exit aperture. The source image is aligned by a folding element to fill the entrance aperture and the lightpipe propagating the source image provides substantially uniform illumination from the exit aperture to a field stop. Focusing a source image propagated from a source, aligning the source image to fill an entrance aperture, and propagating the source image to provide substantially uniform illumination from an exit aperture to a field stop is also described. A specimen review system including a specimen stage configured to receive specimens for viewing, a source of illumination providing illumination to the specimen stage, and a review scope configured to review specimens on the specimen stage is also described.

39 Claims, 6 Drawing Sheets

FIG. 1A: Bright-field Contrast

FIG. 1B: Dark-field Illumination

FIG. 1C: Dark-field objective lens

FIG. 1D: Grey-field contrast

ISOTROPIC ILLUMINATION

FIELD OF THE INVENTION

The present invention relates generally to microscopy. More specifically, isotropic illumination is disclosed.

BACKGROUND OF THE INVENTION

Achieving isotropic or uniform spatial and angular illumination on a specimen is an important goal in microscopy. Equipment limitations and illumination techniques are factors that affect uniformity of illumination. Illumination techniques affect the quality of microscopic research, but conventional techniques are also problematic.

Conventional illumination techniques use light sources such as incandescent lamps/filaments, light emitting diodes, bulbs, or others. These light sources frequently have errors in spatial alignment that exceed the dimensions of surfaces at which light ray emission or propagation occurs. Consequently, light sources cannot fill an aperture sufficiently, requiring alignment of active elements during and/or diffusion within fixed elements to correct these errors. Alignment of active elements can be very effective, but it requires a skilled technician. An operator of a microscope typically does not possess the skills or training for active element alignments after replacement of a source. Active alignment of illumination system components requires training, frequent replacement parts, and can incur significant time delay while adjusting or replacing illumination sources. Diffusion within fixed elements spreads an image of the source but greatly reduces the coupling efficiency. Accommodations for reduced coupling efficiency typically shorten the lifetime of a source. The variable magnitude of these accommodations for reduced coupling efficiency can create color variations in the illumination. Consistent illumination is difficult and requires skills not held by an operator of a microscope. A trained technician in optical assembly of illumination systems may have difficulty achieving the required uniformity in both space and angle.

Incandescent sources are selected based on life span of the illumination elements, dimensions of filament area and power, all of which can affect brightness, uniformity, and color temperature within the illumination field. Incandescent lamps for microscopy display lifetimes in the range of 200 to 2000 hours of use within their nominal operating conditions. Short-lifetime incandescent sources display brighter exitance (exiting power per area) at the filament than long-lifetime sources. Consequently, a short-lifetime bulb can accommodate a low coupling efficiency while a long-lifetime bulb cannot tolerate a drop in coupling efficiency. A short-lifetime bulb can accommodate the poor coupling efficiency of diffusion within fixed elements, but the spatial uniformity can display a deviation of 30 to 40% from its peak. The operating current of a short-lifetime bulb can be varied for control of brightness of the illumination field but there is also a small change in color due to a shift in the temperature of the filament. Long-lifetime halogen bulbs require maintenance of a narrow current range for proper operation to ensure the redeposit of metals (e.g., tungsten) by the halogen gas. The operating current of a long-lifetime bulb cannot be varied for significant control of brightness at the illumination field. Other methods for brightness control affect the spatial and angular uniformity of the illumination field. Poor coupling efficiency and inadequate brightness control frequently eliminate a long-lifetime bulb from use in a microscope.

Another illumination technique involves a light emitting diode (LED), which is bright but also has a small active area with large errors in placement and fixation (i.e., alignment). An LED can easily accommodate the poor coupling efficiency of diffusion within fixed elements, but the spatial uniformity can display a deviation of 30 to 40% from its peak. Further, the resulting illumination may be non-uniform in angle. LEDs display a wide variety of angular profiles, none of which are uniform. LEDs do not display smooth wavelength spectrums. Consequently, the color of an LED system cannot duplicate the blackbody spectrum of an incandescent lamp. The color spectrum of an LED is suitable for a machine vision system. However, it is not typically acceptable to a human observer looking through a microscope. Consistent color temperature cannot be achieved by an LED. LEDs have long lifetimes of 10,000 hours or more.

Thus, what is needed is a solution for isotropic illumination with high coupling efficiency and ease of installation by an operator to permit the use and maintenance of a long-life incandescent bulb. Further, a solution where variation of brightness may occur without an associated change in color temperature is also desirable.

BRIEF DESCRIPTION OF THE DRAWINGS

Various embodiments of the invention are disclosed in the following detailed description and the accompanying drawings.

DETAILED DESCRIPTION OF THE PREFERRED EMBODIMENTS

The invention can be implemented in numerous ways, including as an apparatus, a process, and a system. In this specification, these implementations, or any other form that the invention may take, may be referred to as techniques. In general, the order of the steps of disclosed processes may be altered within the scope of the invention.

A detailed description of one or more embodiments is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Isotropic illumination is disclosed. In some examples, isotropic illumination techniques with high coupling efficiency and ease of installation enables an operator to use and maintain long-life incandescent bulbs with illumination systems. Variation in brightness levels may also be implemented without an associated change in color temperature. LED systems for illumination with machine vision systems require ease of assembly along with consistent and uniform spatial and angular distributions within an illumination field.

Figure 1A:
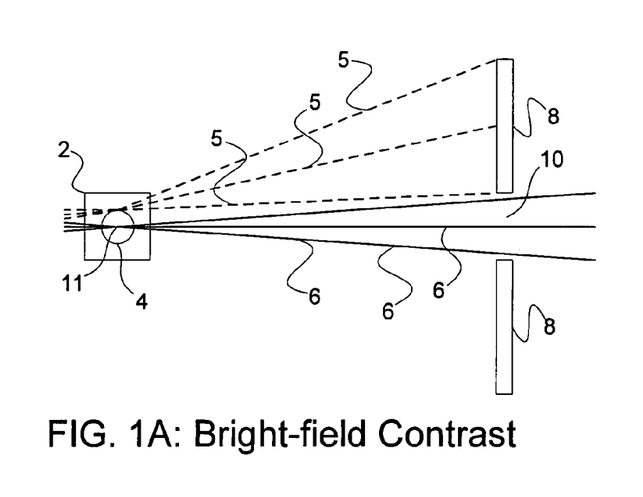
FIG. 1A illustrates bright-field contrast.

FIG. 1A illustrates bright-field contrast. Background material 2, refractive object edge 4, edge-deflected light rays 5, center-deflected light rays 6, lens stop sides 8, collection aperture 10, and refractive object center 11 are shown. A gap between lens stop sides 8 illustrates, in this example, collection aperture 10, into which light rays may be refracted or deflected and gathered. Collection aperture 10 may be almost completely filled by center-deflected light rays 6, which results in a refractive object center appearing bright while refractive object edge 4 appears dark. Refractive object edge 4 deflects exiting light rays away from collection aperture 10, instead of filling it. In contrast, center-deflected light rays 6 pass through collection aperture 10. Consequently, both background material 2 and the refractive object center both appear bright, while refractive object edge 4 appears dark. This may be described as "bright-field contrast," because nearly the entire field is bright. This illumination technique may be used to view a refractive object such as a cell, biological or cytological structure, or other object using a microscope. Another illumination technique besides bright-field is dark-field contrast.

Figure 1B:
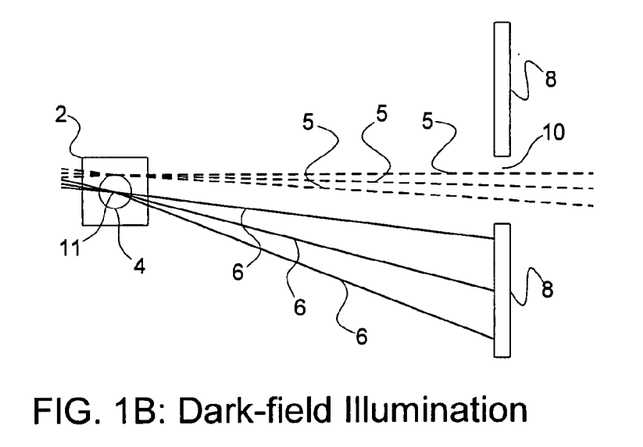
FIG. 1B illustrates dark-field illumination.
Figure 1C:
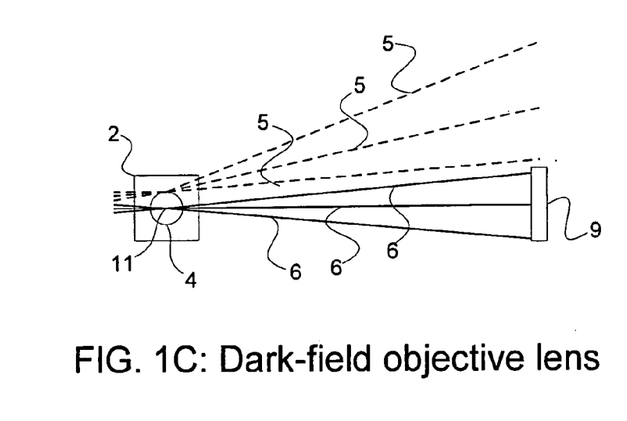
FIG. 1C illustrates a dark-field objective lens.

FIGS. 1B and 1C illustrate two illumination techniques of dark-field contrast, which exploits the collection of edge-deflected light rays 5 from the refractive object edge 4. FIG. 1B illustrates dark-field illumination. FIG. 1C illustrates a dark-field objective lens. The first technique employs directional illumination which is created by an illumination annulus (not shown). Edge-deflected light rays 5 are collected as exiting illumination after being deflected by refractive object edge 4. Center-deflected light rays 6 are completely blocked by lens stop sides 8. Consequently, refractive object edge 4 appears bright while background material 2 and refractive object center 11 appear dark. This technique is known as "dark-field contrast," because nearly the entire field is dark. The second technique of dark-field contrast in FIG. 1C employs an annulus as a collection aperture. Here, center-deflected light rays 6 are blocked by the center disc 9 of the annulus, while edge-deflected light rays 5 pass through the open area surrounding the center disc 9 of the annulus. Consequently, refractive object edge 4 appears bright while background material 2 and refractive object center 11 appear dark. This technique is also known as "dark-field contrast," because nearly the entire field is dark.

Figure 1D:
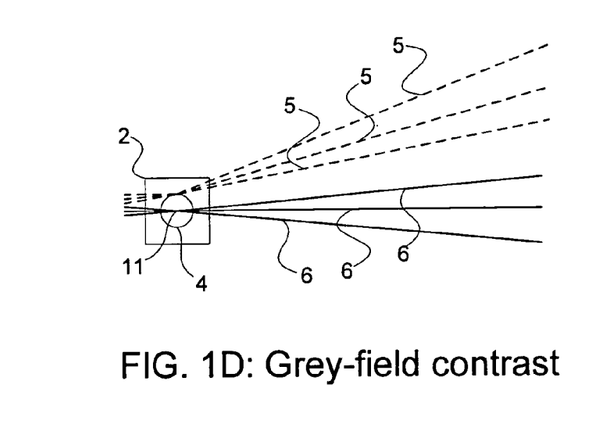
FIG. 1D illustrates grey-field contrast.

FIG. 1D illustrates grey-field contrast. Grey-field contrast is a third technique that uses an illumination cone of angular extent to fill a small portion of a collection aperture. Refractive object edge 4 creates edge-deflected light rays 5. However, both edge-deflected light rays 5 and center-deflected light rays 6 are passed by collection aperture 10 (not shown). Consequently, the refractive object center and background material 2 appear as shades of grey. The grey levels of the refractive object center and background material 2 are determined by absorption and scattering. In some examples, the refractive object may include an absorptive dye for enhancement of grey-field contrast. If neither absorption nor scattering are present, then both object and background may appear uniformly grey with a fine edge of poor contrast.

Illumination techniques affect the quality and nature of viewing a specimen under a microscope and isotropic illumination enhances both aspects. Spatial uniformity is obviously important, but angular uniformity is also critical. Maximum edge contrast in both bright-field and dark-field may have uniform angular illumination within a sharply defined angular range.

Figure 2A:
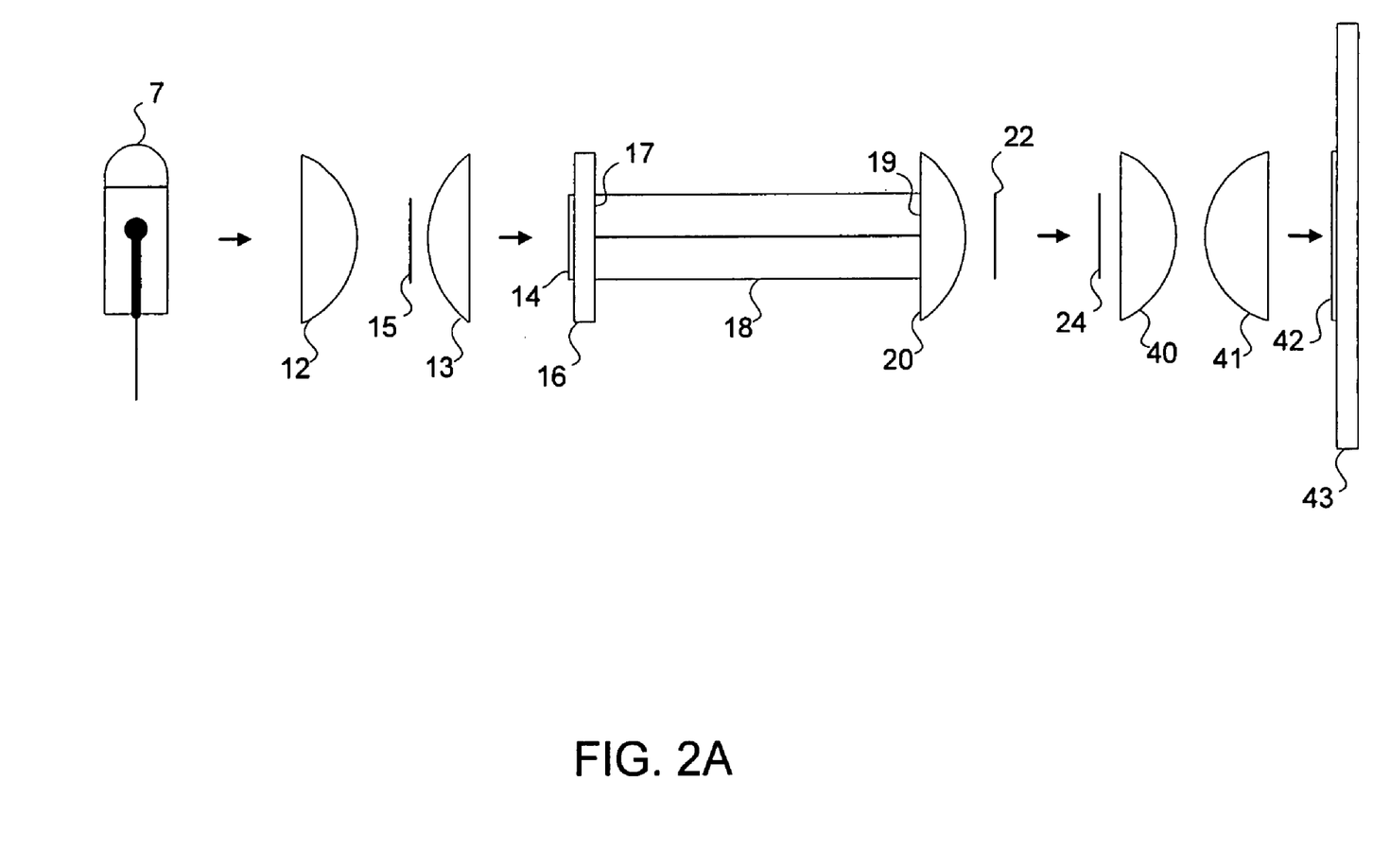
FIG. 2A illustrates a first exemplary isotropic illuminator.

FIG. 2A illustrates a first exemplary isotropic illuminator. In this example, an isotropic illuminator includes several components including source 7, relay lenses 12 and 13, source image 14, source stop 15, diffuser 16, lightpipe 18 (including entrance aperture 17 and exit aperture 19), field lens 20, field stop 22, lens stop 24, condenser lenses 40 and 41, field stop image 42, and specimen 43. An isotropic illuminator may use these components to provide uniform illumination. For descriptive purposes, isotropic or uniform illumination includes both uniform spatial and uniform angular orientation of light rays propagated from an illumination source such as source 7. In other examples, more or fewer components than those shown may be used. Additionally, although the components are shown in alignment with an axis, these components may be configured differently (e.g., off-center, off-axis, transverse to an optical axis, etc.) in other examples.

Light rays from source 7 are propagated towards specimen 43, which is illuminated in a uniform manner, as described above, by field stop image 42. Light rays are propagated from source 7 through relay lenses 12 and 13, which creates source image 14 that fills entrance aperture 17. Although illustrated in this example using multiple lenses, relay lenses 12 and 13 may also be implemented as a single lens in other examples. Source stop 15 controls the irradiance (e.g., watts per area) of illumination produced by source 7. Source stop 15 may be an adjustable iris that controls the irradiance of illumination while maintaining a constant current source which extends illumination source lifetimes and maintains constant color temperature. Diffuser 16 may be used to spread the small angular extent of light rays from relay lenses 12 and 13 and source stop 15 to fill field stop 22 and lens stop 24. In some examples, source stop 15 may be positioned at 10 times its diameter from source image 14. This condition provides for an angular distribution of 10 mrad of convergence at source image 14. As another example, source image 14 may be positioned at 10 times its diameter from source stop 15. This condition provides for a small incident angle of 5 mrad for every convergent ray bundle with source image 14. A small angular convergence and incident angle within source image 14 provides angular uniformity within source image 14.

A small angular convergence (e.g., 10 mrad) may be expanded to fill field-stop 22 and/or lens stop 24. Lightpipe 18 spatially confines light to approximately the dimension of field stop 22 even when diffuser 16 expands light beyond the angular size of field stop 22 with respect to diffuser 16. In some examples, diffuser 16 may be omitted. Without diffuser 16, the length of lightpipe 18 may be at least 10 times its diameter in order for a 10 mrad beam to fill field stop 22. Preferably, every point within field stop 22 receives an equal portion of light from every point within source image 14, providing spatial uniformity within the illumination field of field stop image 42 at specimen 43. Diffuser 16, lightpipe 18 and field lens 20 provide uniform angular distribution throughout field stop 22. Lightpipe 18 spatially confines any diffusion pattern within field stop 22. This spatial confinement during diffusion maintains irradiance at field stop 22. This uniform angular distribution at field stop 22 also creates a uniform spatial distribution at lens stop 24. In some examples, light is uniform in both space and angle at both field stop 22 and lens stop 24, providing optimum contrast and uniform brightness in a refractive object.

As an example of swapped roles for spatial and angular distributions of source 7, a relay lens may create a source image 14 which is not a linear magnification of the spatial distribution of the source, but a linear conversion of the angular distribution of source 7. Here, if source 7 is planar, then the angular distribution of source 7 may represent a Fourier transform of source 7. Therefore, the image of source image 14 may be a scaled Fourier transform of source 7. Source image 14 may also be a scaled conversion of the angular distribution of source 7. Regardless of whether diffuser 16 is used, source image 14 fills entrance aperture 17 and enables lightpipe 18 to provide uniform illumination at field stop 22.

As an example, light pipe 18 separates source image 14 and diffuser 16 from the field stop 22 while maintaining total power within an aperture of lightpipe 18. Both source image 14 and diffuser 16 may have associated grains that may not appear in field stop 22 or the illumination field of field stop image 42. In some examples, a small amount of grain may be acceptable at lens stop 24. The lightpipe 18 may provide sufficient length for 10 mrad or greater convergence to smooth the grain beyond perception within an image at field stop 22. The spatial confinement of lightpipe 18 permits any length of lightpipe 18 without a significant loss of power. The length of lightpipe 18 may be determined by the spatial constraints of an optical instrument or system (e.g., imaging system). The range of lengths for lightpipe 18 provides a range of locations for source 7 and source stop 15. Such range provides access for the operator to source 7 and source stop 15, facilitating replacement of source 7 by an operator and control of brightness.

In this example, there are three adjustable stops (source stop 15, field stop 22, and lens stop 24) that may be employed by an operator of a microscope. Field stop 22 provides adjustment of field stop image 42 to the spatial extent of the illumination provided at specimen 43. Lens stop 24 provides adjustment to the angular extent of the illumination at specimen 43. Source stop 15 provides adjustment to the irradiance of the illumination at specimen 43.

Lightpipe 18 has a length that enhances the spatial uniformity of illumination at field stop 22, after passing through field lens 20. In this example, diffuser 16 at entrance aperture 17 may be connected to lightpipe 18. At exit aperture 19, field lens 20 may be connected to lightpipe 18. However, in other examples, diffuser 16 may be absent and a source image 14 may be directed from relay lenses 12 and 13 to fill entrance aperture 17. Compressible seals such as O-rings square rings and quad rings may be configured around the ends of lightpipe 18 for fixation without obscuration of entrance aperture 17 and exit aperture 19.

Figure 2B:
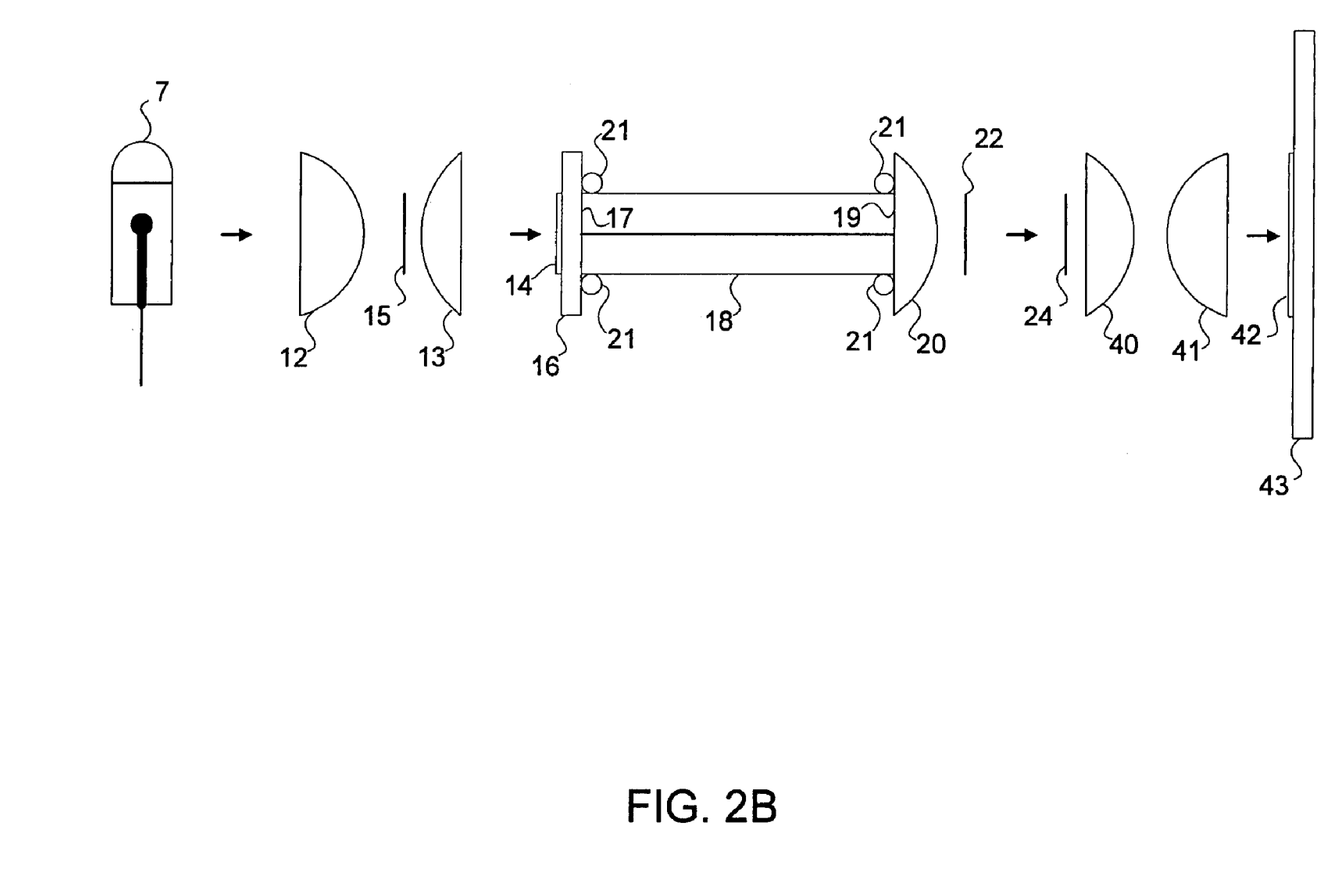
FIG. 2B illustrates a second exemplary isotropic illuminator.

FIG. 2B illustrates a second exemplary isotropic illuminator. The example illustrated in FIG. 2B, includes compressible seals 21 positioned around the ends of lightpipe 18. Compressible seals 21 may be implemented using o-rings, quad rings, gaskets, or other similar sealing devices. Fixtures for the diffuser 16 and field lens 20 may also provide longitudinal pressure upon compressible seals 21 that provides radial pressure upon lightpipe 18 for gripping purposes.

Referring back to FIG. 2A, light rays exit lightpipe 18 at exit aperture 19 and pass through field lens 20. Light propagated through field lens 20 includes light from each point within diffuser 16 or, if diffuser 16 is not used, from each point in source image 14 at entrance aperture 17. Field lens 20 refracts light rays from lightpipe 18 to create a spatially uniform source image at lens stop 24. In this example, field lens 20 refracts light from each point within field stop 22 throughout lens stop 24. In other examples, lens stop 24 may be positioned in front of, between, or after condenser lenses 40 and 41. Lightpipe 18 creates uniform illumination upon field stop 22 by configuring relay lenses 12 and 13, source stop 15, diffuser 16, or field lens 20 for source 7.

Source image 14 fills entrance aperture 17 and, eventually, uniform illumination is provided at specimen 43. Alternatively, diffuser 16 spreads light across entrance aperture 17, but may require alignment of other components. In some examples, one or more condenser lenses 40 and 41 may be used to compress the spatial extent and expand the angular extent of light rays at the illumination field of field-stop image 42. In other examples, condenser lenses may also be omitted. Condenser lenses are described in greater detail below in connection with FIG. 3A.

Figure 3A:
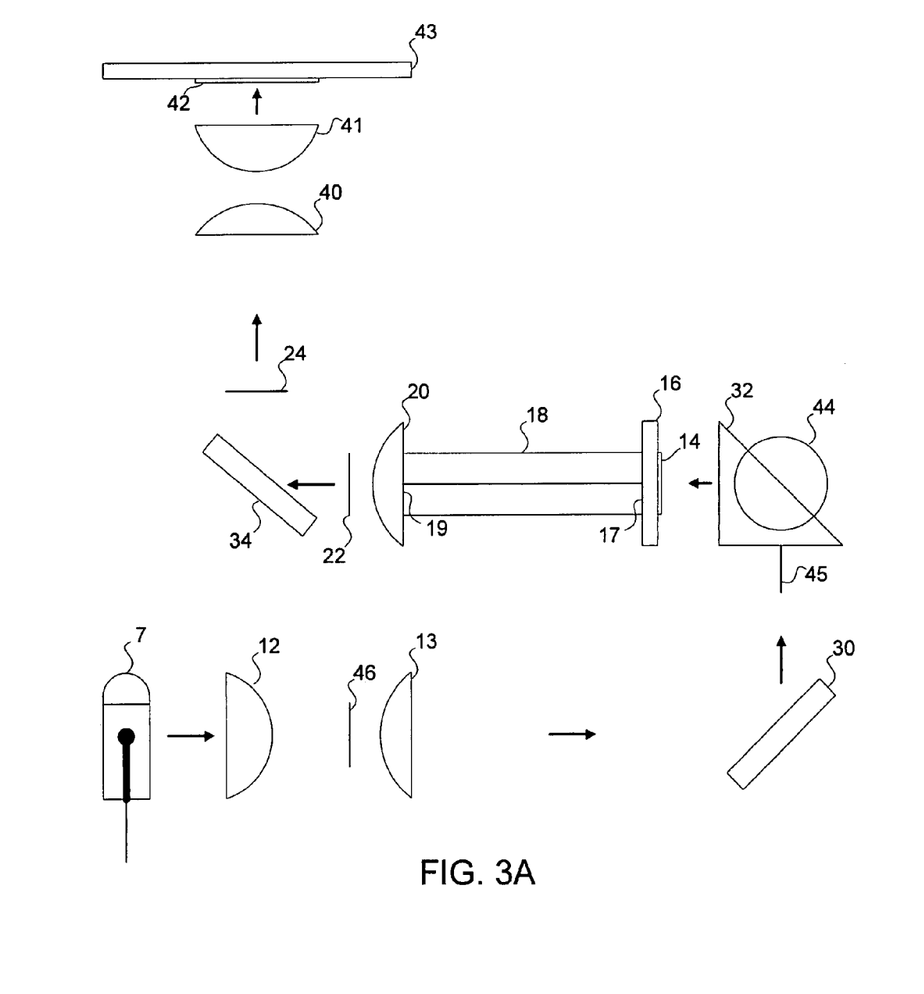
FIG. 3A illustrates a third exemplary isotropic illuminator.

FIG. 3A illustrates a third exemplary isotropic illuminator. Here, source 7, relay lenses 12 and 13, a source image 14, diffuser 16, lightpipe 18 including entrance aperture 17 and exit aperture 19, field lens 20, field stop 22, lens stop 24, field stop image 42, and specimen 43 are shown again. In this example, light rays are propagated from source 7 through relay lenses 12 and 13. Variable source stop 46 is included and may be used to control the amount of irradiance at the source image 14. Variable source stop 46 determines a solid angle of collection for gathering light rays from source 7. Consequently, the irradiance of illumination from source 7 may be controlled with a variable source stop 46 while, using a constant current from a power supply (not shown). After passing through relay lenses 12 and 13, light rays are deflected by a first folding element 30.

As an example, first adjustable folding element (hereinafter "first folding element") 30 may be implemented using a mirror or other reflective device. First folding element 30 may be used to deflect light rays propagated from relay lenses 12 and 13. For example, first folding element 30 propagates light to a second adjustable folding element (hereinafter "second folding element") 32 prior to passing through lightpipe 18 (which may or may not have diffuser 16 located proximally to entrance aperture 17) towards a third adjustable folding element (hereinafter "third folding element") 34. Upon reaching third folding element 34, light rays may be deflected towards condenser lenses 40 and 41 before creating field stop image 42. Condenser lenses 40 and 41 adjust focus of field stop image 42. By adjusting a field stop 24, the area of field stop image 42 on specimen 43 may be contracted or expanded. Other elements may also be used to provide uniform illumination while eliminating the need for active alignment.

Additional components that may be included are a view screen 44 that may be used for aligning source image 14 with entrance aperture 17. As an example, by tilting first folding element 30, source image 14 may be aligned with viewing screen 44. The position of viewing screen 44 may be correlated with diffuser 16 (or entrance aperture 17 if diffuser 16 is not used) when second folding element 32 is rotated through a known angle (e.g., 90 degrees). Here, second folding element 32 may be implemented using a rotating prism, rotated about axis of rotation 45. By tilting third folding element 34, field stop image 42 may be aligned with specimen 43.

Figure 3B:
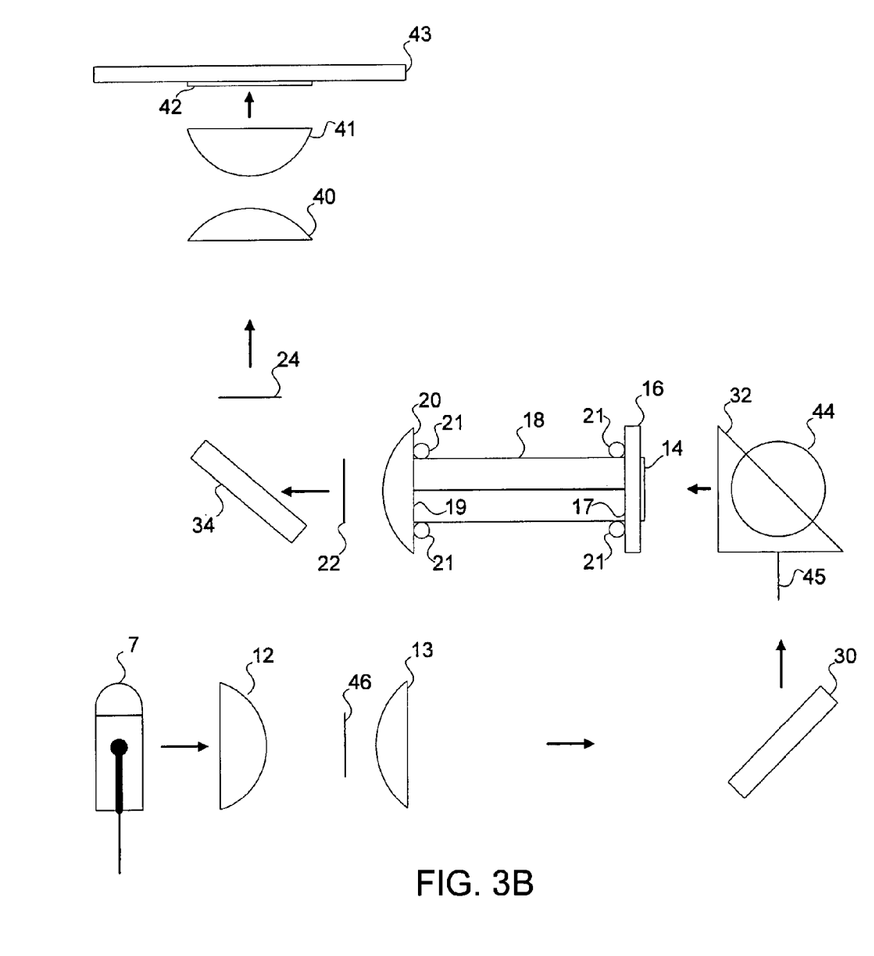
FIG. 3B illustrates a fourth exemplary isotropic illuminator.

FIG. 3B illustrates a fourth exemplary isotropic illuminator. In this example, compressible rings are included. Similar to FIG. 2B, compressible rings 21 may be used to fixate lightpipe 18. In other examples, more or fewer intermediate components may be used to connect diffuser 16 and field lens 20 to lightpipe 18.

Imaging, review, specimen marking, specimen analysis, and other cytological systems may be used with various embodiments of the above techniques. For example, isotropic illumination may be used in imaging systems to provide uniform illumination of specimens to enhance the quality of observation. Automatic and manual imaging or review systems for cytological review, marking, and analysis of specimens may also use isotropic illumination. In some examples, specimen samples may be automatically changed in an imaging system or analyzed to determine which specimens or portions of a specimen are optimal for viewing. Optimal viewing may be determined by various factors such as resolution, magnification, uniformity of illumination, and other parameters. Isotropic illumination may be used in imaging systems such as those described in U.S. Published patent application Ser. No. 10/008,379 to Maenle et al. (filed Nov. 5, 2001, published Sep. 25, 2003), which is herein incorporated by reference in its entirety. Other types of imaging, review, specimen marking, specimen analysis, microscopes, or other optical instrumentation may also be used with the above techniques.

Although the foregoing embodiments have been described in some detail for purposes of clarity of understanding, the invention is not limited to the details provided. There are many alternative ways of implementing the invention. The disclosed embodiments are illustrative and not restrictive.

What is claimed:

1. An isotropic illuminator, comprising:
   a relay lens configured to focus a source image propagated from an incandescent light source; and
   a lightpipe having an entrance aperture and an exit aperture, a diffuser located proximal to the entrance aperture of the lightpipe, the diffuser being connected to the lightpipe using a compressible ring and arranged perpendicular with respect to the lightpipe entrance aperture, wherein the source image is aligned by a first adjustable folding element to align the source image on a center of the diffuser, the lightpipe propagating the source image to provide substantially uniform illumination from the exit aperture to a field stop.

2. The isotropic illuminator of claim 1, wherein the incandescent light source propagates the source image at a constant current.

3. The isotropic illuminator of claim 1, further comprising a lens stop configured to receive spatially uniform illumination from the field stop.

4. The isotropic illuminator of claim 1, further comprising a source stop.

5. The isotropic illuminator of claim 4, wherein the source stop is configured to vary a brightness of the source image.

6. The isotropic illuminator of claim 4, wherein a distance between the source image and the source stop is equal to approximately ten times a diameter of the source stop.

7. The isotropic illuminator of claim 1, wherein an angular distribution of the source image is determined using a Fourier transformation.

8. The isotropic illuminator of claim 1, wherein a length of the lightpipe is equal to at least ten times a diameter of the lightpipe.

9. The isotropic illuminator of claim 1, wherein a field lens is located proximate the exit aperture.

10. The isotropic illuminator of claim 9, wherein the field lens is connected to the lightpipe.

11. The isotropic illuminator of claim 9, wherein the field lens is connected to the lightpipe using a compressible ring.

12. The isotropic illuminator of claim 9, wherein the field lens has a focal length equal to approximately a distance between the field lens and a lens stop.

13. The isotropic illuminator of claim 1, further comprising a field stop that is smaller than the exit aperture by at least one-tenth of a distance between the exit aperture and the field stop.

14. The isotropic illuminator of claim 1, further comprising a first adjustable folding element between the relay lens and the source image, the first adjustable folding element is configured to align the source image in relation to a view screen.

15. The isotropic illuminator of claim 1, further comprising:
    a first adjustable folding element between the relay lens and the source image, the first adjustable folding element deflecting the source image towards the entrance aperture; and
    a second adjustable folding element disposed between the first adjustable folding element and the entrance aperture, the second adjustable folding element aligning the source image on a view screen in a first position and aligning the source image in relation to the entrance aperture in a second position.

16. The isotropic illuminator of claim 15, wherein the second adjustable folding element has a freedom of rotation between the first position and the second position.

17. The isotropic illuminator of claim 15, wherein the second adjustable folding element has a freedom of translation between the first position and the second position.

18. The isotropic illuminator of claim 15, further comprising a third adjustable folding element placed between the field stop and a lens stop, the third adjustable folding element aligning a field stop image on a specimen.

19. The isotropic illuminator of claim 15, further comprising a condenser lens between the field stop and a lens stop.

20. The isotropic illuminator of claim 15, wherein the uniform illumination is uniform in both angular and spatial orientation.

21. A method for isotropic illumination, comprising:
    providing an incandescent illumination source for producing a source image;
    aligning the source image on a diffuser using a relay lens;
    providing a first adjustable folding element between the relay lens and the source image, the first adjustable folding element configured to align the source image in relation to a view screen; and
    propagating the source image through a lightpipe to provide substantially uniform illumination from an exit of the lightpipe aperture to a field stop, the diffuser arranged perpendicular with respect to an entrance of the lightpipe.

22. A biological specimen review system, comprising:
    a specimen stage configured to receive biological specimens for viewing;
    a source of incandescent illumination providing illumination to the specimen stage;
    a review scope configured to review specimens on the specimen stage, the review scope including an isotropic illuminator configured to provide uniform angular illumination from the source to the specimen stage, the isotropic illuminator comprising:
    a relay lens configured to focus a source image propagated from a source; and a lightpipe having an entrance aperture and an exit aperture, a diffuser located proximal to the entrance aperture of the lightpipe, the diffuser being connected to the lightpipe using a compressible ring and arranged perpendicular to the entrance aperture, wherein the source image is aligned by a first adjustable folding element to align the source image on a center of the diffuser, the lightpipe propagating the source image to provide substantially uniform illumination from the exit aperture to a fieid stop.

23. A n isotropic illuminator, comprising:

a relay lens configured to focus a source image propagated from an incandescent light source; and a lightpipe having an entrance aperture and an exit aperture, a diffuser located proximal to the entrance aperture of the lightpipe and arranged perpendicular with respect to the lightpipe entrance aperture, a field lens located proximate the exit aperture and connected to the lightpipe using a compressible ring, wherein the source image is aligned by a first adjustable folding element to align the source image on a center of the diffuser, the lightpipe propagating the source image to provide substantially uniform illumination from the exit aperture to a field stop.

24. The isotropic illuminator of claim 23, wherein the incandescent light source propagates the source image at a constant current.

25. The isotropic illuminator of claim 23, further comprising a lens stop configured to receive spatially uniform illumination from the field stop.

26. The isotropic illuminator of claim 23, further comprising a source stop.

27. The isotropic illuminator of claim 26, wherein the source stop is configured to vary a brightness of the source image.

28. The isotropic illuminator of claim 26, wherein a distance between the source image and the source stop is equal to approximately ten times a diameter of the source stop.

29. The isotropic illuminator of claim 23, wherein an angular distribution of the source image is determined using a Fourier transformation.

30. The isotropic illuminator of claim 23, wherein a length of the lightpipe is equal to at least ten times a diameter of the lightpipe.

31. The isotropic illuminator of claim 23, wherein the field lens has a focal length equal to approximately a distance between the field lens and a lens stop.

32. The isotropic illuminator of claim 23, further comprising a field stop that is smaller than the exit aperture by at least one-tenth of a distance between the exit aperture and the field stop.

33. The isotropic illuminator of claim 23, further comprising a first adjustable folding element between the relay lens and the source image, the first adjustable folding element is configured to align the source image in relation to a view screen.

34. The isotropic illuminator of claim 23, further comprising:

a first adjustable folding element between the relay lens and the source image, the first adjustable folding element deflecting the source image towards the entrance aperture; and a second adjustable folding element disposed between the first adjustable folding element and the entrance aperture, the second adjustable folding element aligning the source image on a view screen in a first position and aligning the source image in relation to the entrance aperture in a second position.

35. The isotropic illuminator of claim 34, wherein the second adjustable folding element has a freedom of rotation between the first position and the second position.

36. The isotropic illuminator of claim 34, wherein the second adjustable folding element has a freedom of translation between the first position and the second position.

37. The isotropic illuminator of claim 34, further comprising a third adjustable folding element placed between the field stop and a lens stop, the third adjustable folding element aligning a field stop image on a specimen.

38. The isotropic illuminator of claim 34, further comprising a condenser lens between the field stop and a lens stop.

39. The isotropic illuminator of claim 34, wherein the uniform illumination is uniform in both angular and spatial orientation.

* * * * *